(12) United States Patent
Lai et al.

(10) Patent No.: US 10,473,538 B2
(45) Date of Patent: Nov. 12, 2019

(54) PRESSURE SENSING DEVICE HAVING A RIGID FORCE CONDUCTOR AND A SOFT DEFORMABLE OBJECT SENSING ARRANGEMENT

(71) Applicant: TPK Universal Solutions Limited, Hong Kong (CN)

(72) Inventors: Sheh-Jung Lai, Taichung (TW); Ming-Chuan Lin, Taichung (TW); Kuo-Hsin Wang, Nantou County (TW); Li-Jyuan Lu, Taichung (TW)

(73) Assignee: TPK Universal Solutions Limited, Hong Kong (HK)

( * ) Notice: Subject to any disclaimer, the term of this patent is extended or adjusted under 35 U.S.C. 154(b) by 190 days.

(21) Appl. No.: 15/499,919

(22) Filed: Apr. 28, 2017

(65) Prior Publication Data

US 2017/0315003 A1     Nov. 2, 2017

(30) Foreign Application Priority Data

Apr. 29, 2016   (CN) .......................... 2016 1 0285016

(51) Int. Cl.
| | | |
|---|---|---|
| *G01L 1/22* | (2006.01) | |
| *G02F 1/1333* | (2006.01) | |
| *G06F 3/041* | (2006.01) | |
| *G06F 3/045* | (2006.01) | |
| *G01L 1/20* | (2006.01) | |

(52) U.S. Cl.
CPC .............. *G01L 1/2287* (2013.01); *G01L 1/20* (2013.01); *G01L 1/2268* (2013.01); *G02F 1/13338* (2013.01); *G06F 3/045* (2013.01); *G06F 3/0414* (2013.01); *G06F 3/0418* (2013.01); *G06F 2203/04103* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 4,479,392 A | * | 10/1984 | Froeb ........................ | G01L 1/14 338/47 |
| 4,738,146 A | * | 4/1988 | Baumgartner ............ | G01L 1/20 338/114 |
| 8,393,229 B2 | * | 3/2013 | Tao ...................... | A43B 3/0005 73/862.046 |
| 8,800,385 B2 | * | 8/2014 | Ikebe ........................ | G01L 1/04 73/862.041 |
| 9,317,154 B2 | * | 4/2016 | Perlin ..................... | G06F 3/005 |
| 9,841,339 B2 | * | 12/2017 | Chang ..................... | G01L 9/006 |
| 2006/0232559 A1 | * | 10/2006 | Chien ..................... | G06F 3/044 345/168 |
| 2012/0198645 A1 | * | 8/2012 | Hilger ..................... | A47L 13/10 15/222 |

\* cited by examiner

*Primary Examiner* — Peter J Macchiarolo
*Assistant Examiner* — Jermaine L Jenkins
(74) *Attorney, Agent, or Firm* — Cooper Legal Group, LLC (57) ABSTRACT

A pressure sensing device is provided. The pressure sensing device includes a force sensor. The pressure sensing device further includes a rigid force conductor and a soft deformable object. The rigid force conductor is disposed between the force sensor and the soft deformable object.

20 Claims, 8 Drawing Sheets

PRESSURE SENSING DEVICE HAVING A RIGID FORCE CONDUCTOR AND A SOFT DEFORMABLE OBJECT SENSING ARRANGEMENT

RELATED APPLICATIONS

This application claims priority to China Application Serial Number 201710285016.0, filed Apr. 29, 2016, which is herein incorporated by reference.

BACKGROUND

Technical Field

The disclosure relates to pressure sensing. More particularly, the disclosure relates to a pressure sensing device.

Description of Related Art

Some touch devices, such as mobile phones and sports bracelets, are already equipped with pressure sensing devices. Taking the mobile phones as an example, usually the pressure sensing device is disposed under the screen of the mobile phone. When a user uses a finger or stylus to execute a pressing operation on a touch device, the pressure sensing device can detect the pressing force corresponding to the pressing operation for recognizing the input operation of the user by its force intensity, such as light touch, light press, strong press, and so on. Different force intensities can be set to match different functions to expand the dimension of human-computer interaction.

A common pressure sensing device comprises an independent pressure sensing layer disposed in parallel with the touch sensing layer and/or the display in the existing touch sensing device, or several mechanical pressure sensing devices disposed in the non-display area of the touch sensing device side-by-side with the touch sensing layer and/or the display; the former has higher sensitivity but with a larger thickness of the entire device, and the latter can have a better space efficiency while the traditional mechanical pressure sensing device has a poor sensitivity. Traditional mechanical pressure sensing device usually includes a force sensor and a spring deformation meter, when the spring is deformed corresponding to a force, a reaction force is transmitted to the force sensor. The force sensor will generate electronic signal outputs when it is pressed, and different magnitudes of the signals correspond to different magnitudes of the pressing forces. However, due to assembly tolerances of the entire pressure sensing device, or the smaller deformable space of the spring deformation meter, the pressing force can not be precisely detected by the force sensor, or, the detected force intensity would have a bigger deviation from the actual force intensity. As such, the force sensor has a smaller intensity detection range and less accuracy in detecting force intensity, and it is hard to achieve multi-level range of force intensity detection. Thus, the existing pressure sensing devices should be improved.

SUMMARY

In order to overcome the poor force detection performance of traditional pressure sensing devices, the disclosure provides a pressure sensing device.

The disclosure provides a pressure sensing device that overcomes the aforementioned problems, the pressure sensing device includes a force sensor, and the pressure sensing device further includes a rigid force conductor and a soft deformable object, wherein the rigid force conductor is disposed between the force sensor and the soft deformable object.

In at least one embodiment, the rigid force conductor includes a sheet, the sheet is placed between the force sensor and the soft deformable object, and is in direct contact with the soft deformable object.

In at least one embodiment, the rigid force conductor further includes a bulge, the bulge and the sheep are formed integrally or separately, and the bulge is placed between the force sensor and the sheet, and is in direct contacts with the force sensor.

In at least one embodiment, a surface on which the force sensor and the bulge make contact is a first surface, and a contact area of the bulge and the force sensor is smaller than an area of the first surface.

In at least one embodiment, the sheet is U-shaped or semi-U-shaped.

In at least one embodiment, the force sensor is disposed on a carrying layer, and at least one end of the sheet is connected to the carrying layer on which the force sensor is disposed.

In at least one embodiment, one end of the sheet has at least two portions.

In at least one embodiment, the sheet is C-shaped, one end of the sheet has two portions, between the two portions is an opening, a bulge is disposed on an inner wall of the sheet corresponding to a position of the opening, the bulge and the sheet are formed integrally or separated, and the position of the opening is corresponding to a position of the force sensor.

In at least one embodiment, the pressure sensing device further includes a casing, and the soft deformable object is attached to the casing or to the rigid force conductor.

In at least one embodiment, the rigid force conductor is one of a metal, a hard rubber, or a plastic, and the soft deformable object is one of a soft rubber, a foam, or a silicon.

In at least one embodiment, the rigid force conductor is a hard rubber with a sulfur coefficient over 25, and the soft deformable object is a soft rubber with a sulfur coefficient under 15.

In at least one embodiment, the pressure sensing device further includes a cover plate and a casing for clamping the pressure sensing device.

In at least one embodiment, the force sensor is subjected to a pre-pressing force as a result of clamping the cover plate and the casing against the pressure sensing device, and the pre-pressing force is 0.5-1.5N.

In at least one embodiment, the pressure sensing device further includes a first carrying layer, the first carrying layer is a carrier of the force sensor, and the first carrying layer is the cover plate or an FPC layer attached on the cover plate which is different from a pressing operation surface.

In at least one embodiment, the pressure sensing device further includes an LCD module, the LCD module is disposed between the cover plate and the casing, the LCD module includes a backlight baseplate, the backlight baseplate is rectangular and an extending portion is extending from a right angle position of the backlight baseplate, and the sheet of the rigid force conductor is formed by bending the extending portion.

BRIEF DESCRIPTION OF THE DRAWINGS

FIG. 2B is a diagram illustrating the force magnitudes of the pre-pressing forces which the pressure sensing device in FIG. 2A is subjected to.

DETAILED DESCRIPTION

Reference will now be made in detail to the present embodiments of the disclosure, examples of which are illustrated in the accompanying drawings. This disclosure may, however, be embodied in many different forms and should not be construed as limited to the embodiments set forth herein.

Furthermore, positional terms, such as "lower" or "bottom", "upper" or "top", and "left" and "right", may be used herein to describe one element's relationship to another element as illustrated in the Figures. That is, the positional terms refers only to relative positions within particular views, not absolute positions. And "upper" means a direction relatively closer to the object exerting the pressure.

Figure 1A:
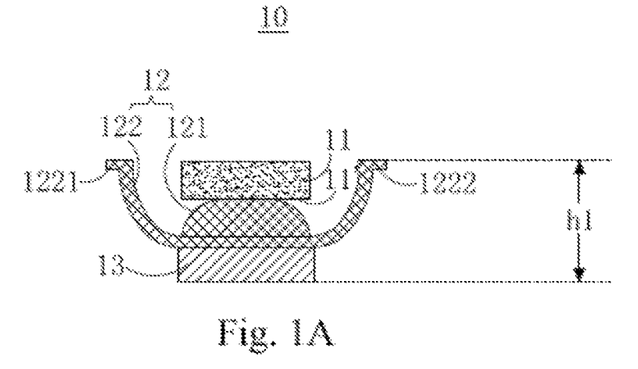
FIG. 1A is a cross-sectional view of a pressure sensing device according to a first exemplary embodiment of the present disclosure.

Please refer to FIG. 1A. A first exemplary embodiment of the present disclosure provides a pressure sensing device 10, and the pressure sensing device 10 can be used for being disposed inside electronic products such as mobile phones, notebooks, or sports bracelets, for detecting the pressing force scale. The pressure sensing device 10 at least includes a force sensor 11, a rigid force conductor 12 and a soft deformable object 13, and the rigid force conductor 12 is placed between the force sensor 11 and the soft deformable object 13. After the pressure sensing device 10 is placed inside the electronic product, the rigid force conductor 12 remains directly in contact with both the force sensor 11 and the soft deformable object 13.

The rigid force conductor 12 is formed of rigid material, which has a better force transmission characteristic. When subjected to pressure, the rigid material can better transmit the force to other components which are in direct contact with the rigid force conductor 12. The rigid force conductor 12 includes a bulge 121 and a sheet 122. The bulge 121 and the sheet 122 are preferably formed integrally, or the bulge 121 and the sheet 122 can be formed separately. The bulge 121 is arch-shaped, with an arched top oriented towards the direction of the force sensor 11. The sheet 122 has a plane which is sufficiently in contact with the soft deformable object 13. In an exemplary embodiment, the sheet 122 further has two fixing legs, which can be bent into a U-shaped structure by bending the sheet material, and the U-shaped opening is placed towards the force sensor 11. The bulge 121 is placed on a bottom plane of the U-shaped sheet 122. The U-shaped sheet 122 includes a first leg 1221 and a second leg 1222, and the first leg 1221 and the second leg 1222 are disposed at the ends of the bottom plane of the U-shaped sheet 122 and are curved to keep the formable abilities. Moreover, the first leg 1221 and the second leg 1222 are further used for ensuring the precise alignment of the rigid force conductor 12 and the force sensor 11. When the force sensor 11 is fixed on a carrier (not shown), the first leg 1221 and the second leg 1222 are positioned on particular positions at two ends of the force sensor 11 on the carrier, making the bulge 121 of the rigid force conductor 12 and the force sensor precisely aligned. The bulge 121 is in contact with the force sensor 11, and the sheet 122 is in contact with the soft deformable object 13, and the position of the soft deformable object 13 corresponds to the position of the bulge 121. A surface on which the force sensor 11 and the bulge 121 make contact is a first surface 11', and a contact area between the bulge 121 and the force sensor 11 is smaller than an area of the first surface 11'. Preferably, the contact area between the bulge 121 and the force sensor 11 is 30%-80% of the area of the first surface 11'. A vertical projection area of the bulge 121 is smaller than a vertical projection area of the sheet 122 and a vertical projection area of the soft deformable object 13. The bulge 121 and the sheet 122 are rigid material, which can be either one of metal, hard rubber, or plastic. The hard rubber is preferably a hard rubber with a sulfur coefficient over 25.

The soft deformable object 13 is soft material, which has better deformability, and will generate different scales of deformation corresponding to different intensities of pressure. The soft material can be one of soft rubber, foam, or silicon. Preferably, the soft rubber has a sulfur coefficient under 15.

When there is no other external force except gravity added to the pressure sensing device 10, a total height of the force sensor 11, the bulge 121, the sheet 122 and the soft deformable object 13 is h1. When the pressure sensing device 10 is pressed, the soft deformable object 13 will firstly generate a deformation.

Figure 1B:
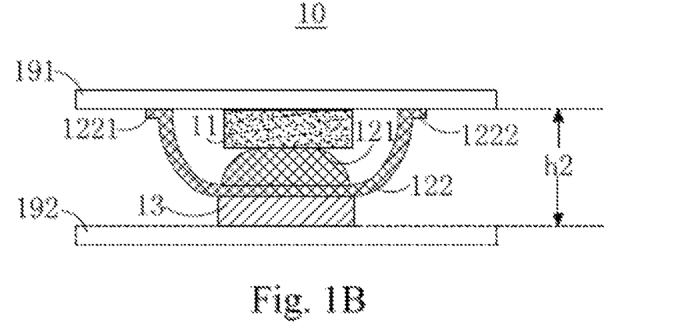
FIG. 1B is a cross-sectional view of another example of a pressure sensing device according to the first exemplary embodiment of the present disclosure.

Please refer to FIG. 1B. The pressure sensing device 10 further includes a first carrying layer 191, and the first carrying layer 191 is the carrier of the force sensor 11, that is, the force sensor 11 is formed or attached on the first carrying layer 191 or is disposed right next to the first carrying layer 191. The first leg 1221 and the second leg 1222 on the sheet 122 are respectively fixed on the first carrying layer 191 or disposed right next to the first carrying layer 191. The soft deformable object 13 uses the second carrying layer 192 as a carrier, that is, the soft deformable object 13 is directly attached on the second carrying layer 192 or is disposed right next to the second carrying layer 192. The first carrying layer 191 and the second carrying layer 192 can be any matching stacked structures in the electronic products, such as the pressing operation cover plate and the casing, or the FPC layer and the case of the touch panel.

When the pressure sensing device 10 is disposed inside the electronic product, the force sensor 11, the bulge 121, the sheet 122 and the soft deformable object 13 are sequentially disposed between the first carrying layer 191 and a second carrying layer 192 and a corresponding height is h2, in which h2<h1, that is, the force sensor 11, the bulge 121, the sheet 122 and the soft deformable object 13 are clamping between the first carrying layer 191 and the second carrying layer 192, and a clamping force hence is generated. Since the soft deformable object 13 has a better deformability characteristic, it will slightly deform under the clamping force and generate at least a reaction force to the rigid force conductor 12, since the rigid force conductor 12 has a better force transmission characteristic, which transmits the reaction force to the force sensor 11, to provide the force sensor 11 a pre-pressing force. A magnitude of the pre-pressing force is 0.5-1.5N, and is preferably 0.8-1.2N.

Figure 2A:
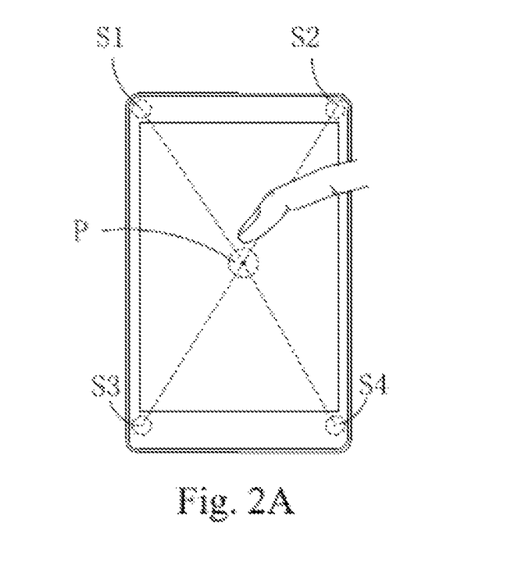
FIG. 2A is a diagram illustrating the touch device with the pressure sensing device of the present disclosure.
Figure 2B:
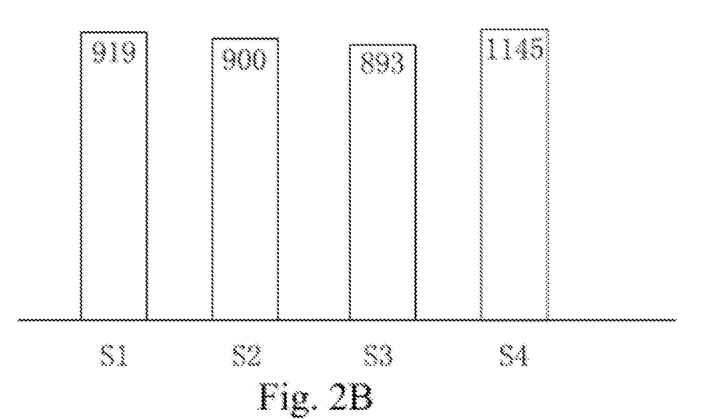

The pre-pressing force design not only makes the contact between the components of the pressure sensing device 10 tighter, but also avoids the presence of a gap between the components which would cause the pressing force to be undetectable or the detected pressing force to be less than the actual pressing force. At the same time, the design of the pre-pressing force has the following advantages:

1. The pre-pressing force design can provide a calibration function for the force sensor 11. Please refer to FIG. 2A and FIG. 2B. Taking the touch device illustrated in FIG. 2A as an example, wherein existing pressure sensing devices S1, S2, S3, and S4 are disposed at the four corners, and the distances from the four corners to the central position P of the touch device are the same. Theoretically, when a force is evenly applied to the position P, the force intensities detected by the four pressure sensing devices S1, S2, S3, and S4 should be the same. However, there are manufacturing tolerances on all the components, and the assembly processes are also difficult to be exactly the same, making the detected results at the pressure sensing devices S1, S2, S3, and S4 different when the user presses the central position of the touch device. As shown in FIG. 2B, there are errors in the detected results, and the errors will decrease the precision of the pressure detection. The pre-pressing force design in the pressure sensing device 10 can reduce the errors. Since each pressure sensing device 10 inside the electronic product is subject to a pre-pressing force, when differences exist in the magnitudes of the pre-pressing forces of different pressure sensing devices 10, there are differences of the pressure sensing devices 10 due to manufacturing processes or assembly processes. At this time, the pressure sensing devices 10 can be calibrated to make different pressure sensing devices 10 have the same force detection performance. The specific corrective actions include adjusting the resistance of the force sensor 11 or correcting the electrical signals detected by the pressure sensing device 10 by software programs.

Figure 2C:
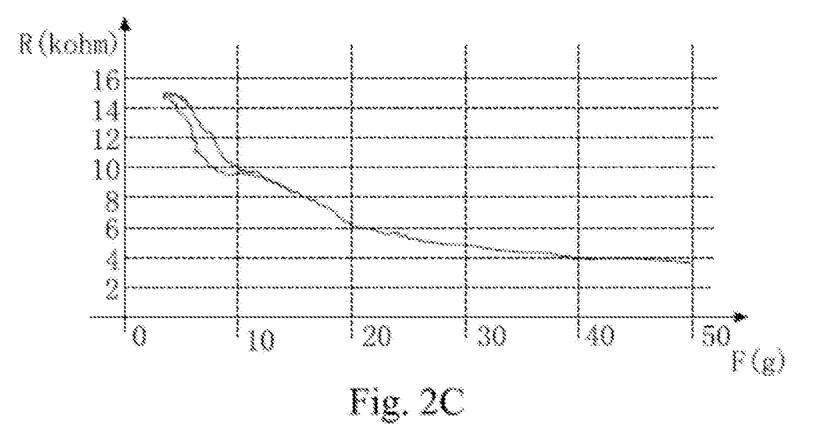
FIG. 2C is a curve of the electronic signals outputted from the force sensor versus the pressing force when the force sensor is pressed.

2. The pre-pressing force makes an electronic signal-force intensity curve which is generated by the force sensor 11 responsive to the pressing force with better linearity. Please refer to FIG. 2C. In FIG. 2C, the force sensor 11 of the pressure sensing device 10 is a resistive force sensor as an example. At the starting point (i.e., a smaller pressing force) of the pressing force-electronic signal (resistance) curve, the resistive force sensor generates no electronic signals or the generated electronic signals include more noise. However, when the pressing force increases, the pressing force-electronic signal curve has better linearity. In the present disclosure, applying the pre-pressing force design makes the pressure sensing device 10 avoid the starting position of the pressing force-electronic signal curve when it is pressed. Therefore, the electronic signals generated by the force sensor 11 responsive to the pressing force will correspond to a more linear section of the pressing force-electronic signal curve, to reduce the complexity of the pressure signal processing, and further improve the precision of the pressure detection.

Figure 3A:
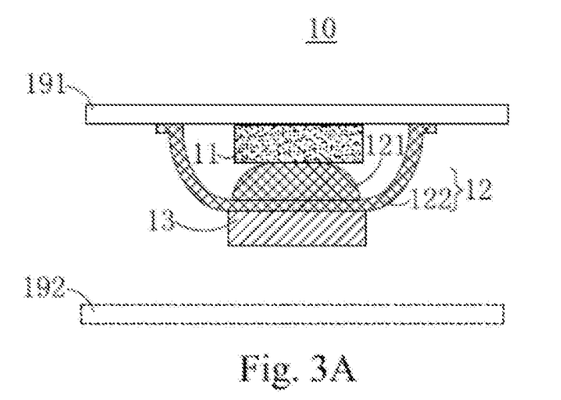
FIG. 3A is a diagram illustrating a structure of the pressure sensing device before the assembly according to the first exemplary embodiment of the present disclosure.

Please refer to FIG. 3A. The first carrying layer 191, the force sensor 11, the rigid force conductor 12 and the soft deformable object 13 of the pressure sensing device 10 can be formed in advance, and the force sensor 11 can be formed or attached to the first carrying layer 191 or is disposed right next to the first carrying layer 191, and the first leg 1221 and the second leg 1222 on the rigid force conductor 12 are respectively fixed on the first carrying layer 191 or disposed right next to the first carrying layer 191. The soft deformable object 13 is disposed at a side of the sheet 122 away from the force sensor 11. The pressure sensing device 10 is disposed inside the electronic products to make the soft deformable object 13 and the second carrying layer 192 contact tightly. In another exemplary embodiment, each element of the pressure sensing device 10 can be formed separately and then the elements disposed into the electronic products individually, as shown in FIG. 3B and FIG. 3C.

Figure 3B:
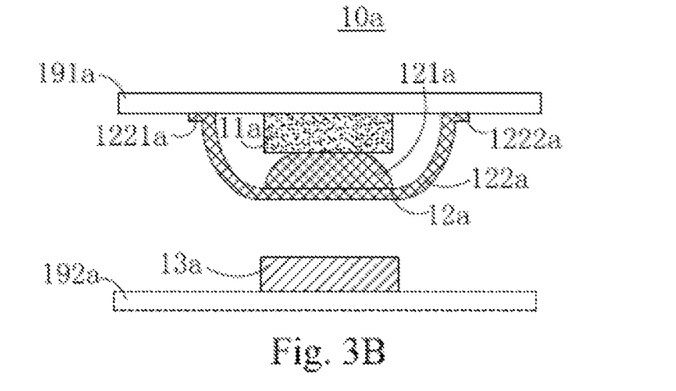
FIG. 3B-3C are diagrams illustrating the structures of the pressure sensing device in FIG. 3A before the assembly according to other examples of the present disclosure.

In FIG. 3B, after the pressure sensing device 10*a* is placed inside the electronic product, the structure of the pressure sensing device 10*a* will be the same as that of the pressure sensing device 10 shown in FIG. 1B. Before the pressure sensing device 10*a* is placed into the electronic product, the force sensor 11*a* uses the first carrying layer 191*a* as the carrier, and the bulge 121*a* of the rigid force conductor 12*a* is fixed under the force sensor 11*a*. The first leg 1221*a* and the second leg 1222*a* of the sheet 122*a* which are formed integrally with the bulge 121*a* are respectively fixed on the first carrying layer 191*a* or disposed right next to the first carrying layer 191*a*. The soft deformable object 13*a* is provided individually, which is fixed on the second carrying layer 192*a* in advance by a manner such as pasting. During assembly processes, the force sensor 11*a*, which has the first carrying layer 191*a* on one side and the rigid force conductor 12*a* on the other side, is disposed into the electronic product, to make the rigid force conductor 12*a* and the soft deformable object 13*a* in close contact.

Figure 3C:
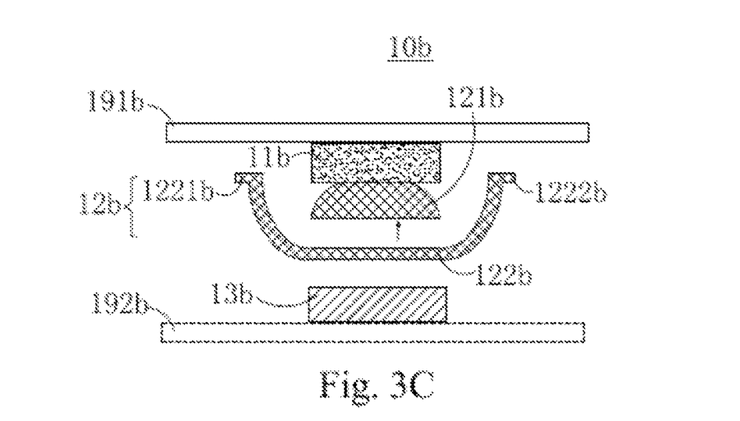

In FIG. 3C, after the pressure sensing device 10*b* disposed into the electronic product, the structure of the pressure sensing device 10*b* will be the same as that of the pressure sensing device 10 shown in FIG. 1B. Before the pressure sensing device 10*b* is placed into the electronic product, the force sensor 11b uses the first carrying layer 191b as the carrier. The bulge 121b of the rigid force conductor 12b connects to the bottom of the force sensor 11b, and the sheet 122a and the bulge 121b are disposed individually. During the assembly processes, the first carrying layer 191b carrying a force sensor 11b is disposed inside the electronic product, and then the first leg 1221b and the second leg 1222b on the sheet 122b are respectively fixed on the first carrying layer 191b or disposed right next to the first carrying layer 191b, and the bulge 121b is placed at the bottom of the U-shaped sheet 122b and keeps in contact with the sheet 122b. The soft deformable object 13b is fixed on the second carrying layer 192b in advance by means such as pasting, and the position of the soft deformable object 13b corresponds to that of the rigid force conductor 12b, and, after the assembly, the rigid force conductor 12b is in close contact with the rigid force conductor 12b.

Figure 4A:
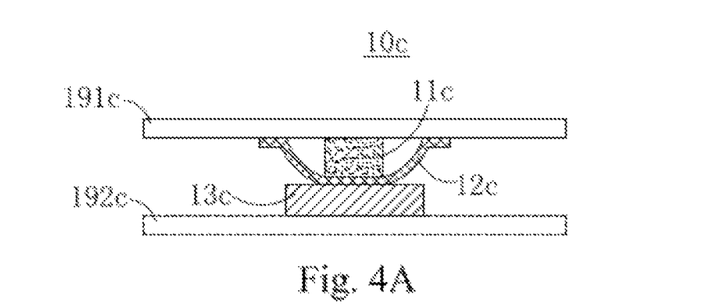
FIG. 4A-4B are diagrams illustrating structures of the pressure sensing device in FIG. 1B according to another exemplary embodiment of the present disclosure.

Please refer to FIG. 4A. FIG. 4A is a diagram illustrating a pressure sensing device 10 according to another exemplary embodiment of the present disclosure. The pressure sensing device 10c sequentially includes a first carrying layer 191c, a force sensor 11c, a rigid force conductor 12c and a soft deformable object 13c in close contact. When disposing the aforementioned elements into the electronic product, the soft deformable object 13c and the second carrying layer 192c of the pressure sensing device 10c are in close contact to subject the force sensor 11c to a pre-pressing force. The difference between the pressure sensing device 10c and the pressure sensing device 10 shown in FIG. 1B is that the rigid force conductor 12c includes a sheet (not shown), and the rigid force conductor 12c does not have the bulge 121 of the rigid force conductor 12.

Figure 4B:
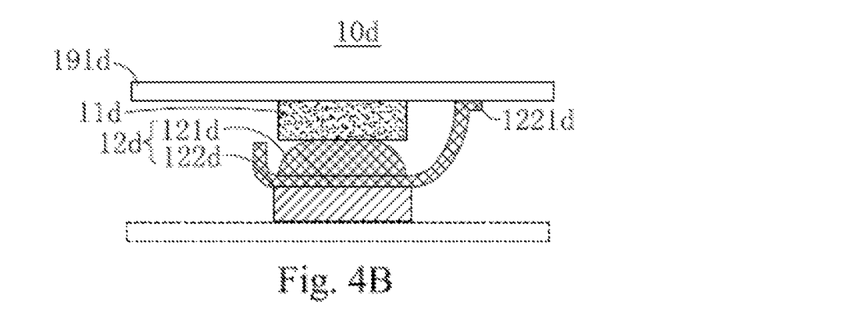
Figure 4C:
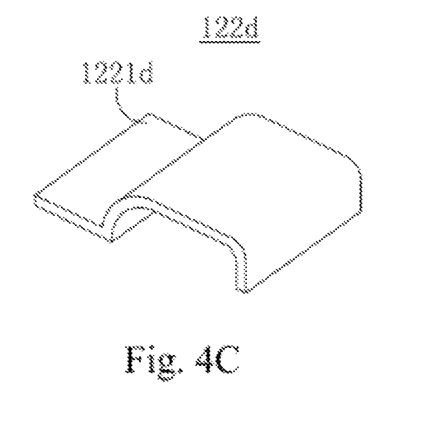
FIG. 4C is a three-dimensional diagram of the sheet in FIG. 4B.

Please refer to FIG. 4B and FIG. 4C. FIG. 4B is a diagram illustrating a pressure sensing device 10d according to still another exemplary embodiment of the present disclosure. The difference between the pressure sensing device 10d and the pressure sensing device 10 shown in FIG. 1B is that the shape of the sheet 122d of the rigid force conductor 12d is different from the structure of the sheet 122. The sheet 122d is formed by bending a sheet material, and is basically semi-U-shaped, it only has a first leg 1221d to connect to the first carrying layer 191d, such that the sheet 122d does not have a second leg 1222 of the sheet 122. The bulge 121d is placed at the bottom of the semi-U-shaped. The bulge 121d and the sheet 122d can be formed integrally or separately.

Figure 4D:
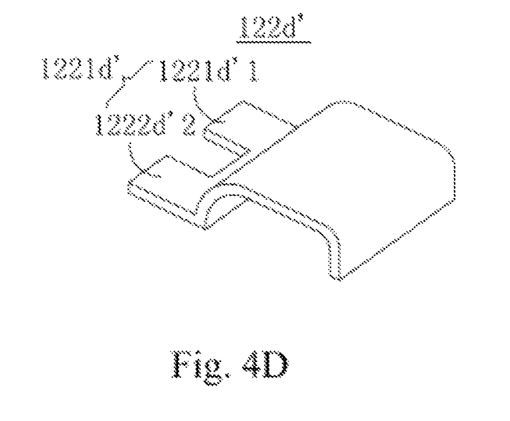
FIG. 4D is a three-dimensional diagram of another example of the sheet in FIG. 4C.

Please refer to FIG. 4D. FIG. 4D is a structure diagram illustrating another exemplary embodiment of the sheet different from the sheet 122d in FIG. 4C. The difference between the two sheets is that in FIG. 4D the first leg 1221d' of the sheet 122d' further opens from the medium and is divided into two portions: a first portion 1221d'1 and a second portion 1221d'2. The purpose of the arrangement is that, as shown in FIG. 4B and FIG. 4C, when the sheet 122d only has a first leg 1221d connected to the first carrying layer 191d, since there is only an aligning point (i.e., the first leg 1221d), the sheet 122d will be easily misaligned when it is fixed to the first carrying layer 191d, making the alignment of the sheet 122d and the force sensor 11d inaccurate. In the embodiment, by using the sheet 122d', wherein the first leg 1221d' for connecting to the carrier of the force sensor has an opening in the middle and thus is divided into two portions to increase the aligning points during fixing, the alignment between the sheet 122d' and the carrier of the force sensor is made more accurate, and deflection avoided.

Figure 4E:
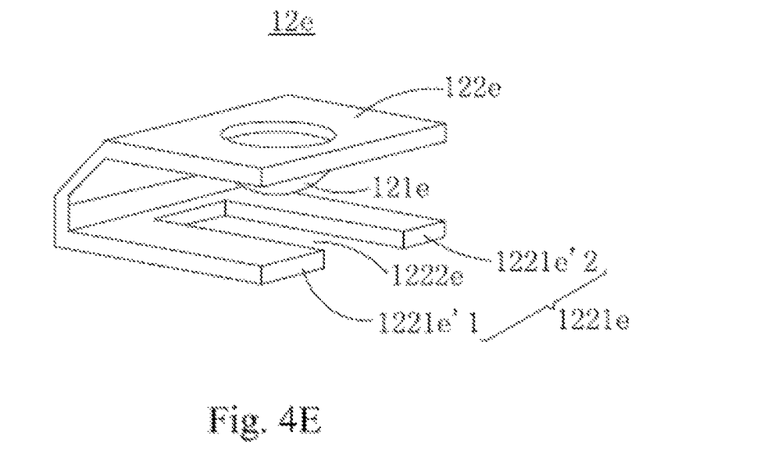
FIG. 4E is a diagram illustrating a structure of another example of the rigid force conductor in FIG. 4B.

Please refer to FIG. 4E. FIG. 4E is a diagram illustrating a rigid force conductor according to another exemplary embodiment of the present disclosure. The difference between FIG. 4B and FIG. 4E is that the shape of the sheet 122e of the rigid force conductor 12e is different from the shape of the sheet 122d. The sheet 122e in FIG. 4E is generally in C-shape from the side, wherein one end includes a first leg 1221e. The first leg 1221e has an opening 1222e from the medium and hence is divided into a first portion 1221e'1 and a second portion 1221e'2. The sheet 122e is fixed to a carrier (not shown) of the force sensor (not shown) by the first leg 1221e. An inner wall of the sheet 122e which corresponds to the position of the opening 1222e has a bulge 121e, and the bulge 121e and the sheet 122e can be formed integrally or separately. When the sheet 122e is fixed to the carrier of the force sensor, the force sensor is at the opening 1222e and is in contact with the bulge 121e. The purpose of the arrangement is that, as shown in FIG. 4B and FIG. 4C, when the sheet 122d only having a first leg 1221d connects to the first carrying layer 191d, since there is only an aligning point (i.e., the first leg 1221d), the sheet 122d will be easily misaligned when it is fixed to the first carrying layer 191d, making the alignment of the sheet 122d and the force sensor 11d inaccurate. In this embodiment, by using the sheet 122e, wherein the first leg 1221e for connecting to the carrier of the force sensor has an opening in the middle, and thus is divided into two portions to increase the aligning points during the fixing, the alignment between the sheet 122e and the carrier of the force sensor is made more accurate, and deflection avoided. Moreover, since the position of the opening 1222e corresponds to both the bulge 121e and the force sensor, the alignment precision of the bulge 121e and the force sensor is improved.

Figure 4F:
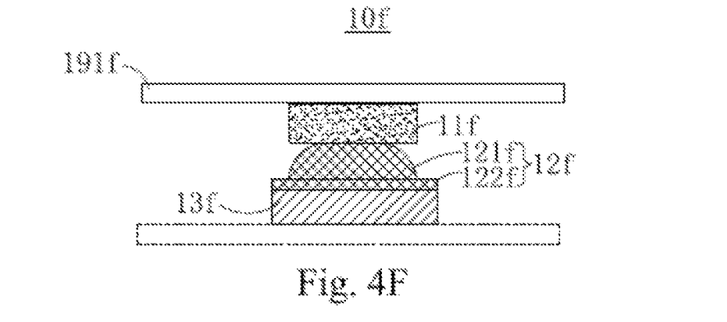
FIG. 4F is a diagram illustrating a structure of another exemplary embodiment of the pressure sensing device in FIG. 1B.

Please refer to FIG. 4F. FIG. 4F is a diagram illustrating a pressure sensing device according to a further exemplary embodiment of the present disclosure. The difference between the pressure sensing device 10f and the pressure sensing device 10 shown in FIG. 1B is that the shape of the sheet 122f is different from that of the sheet 122. The sheet 122f is a rigid plane sheet, and is disposed between the soft deformable object 13f and the bulge 121f, and the force sensor 11f formed on the first carrying layer 191f is in contact with the bulge 121f.

Compared to the existing art, the pressure sensing device 10 and/or other exemplary embodiments of the present disclosure have the following advantages:

1. In applying the rigid force conductor 12 and the soft deformable object 13 to cooperate with the force sensor 11 to execute the pressure detection, the soft deformable object 13 is soft material, which has a larger deformable range. Taking a spring with a same elastic coefficient of that of the soft deformable object 13 as an example, supposing that a unit length of spring subjected to compression hits its compression limit after reaching L1 displacement, due to its characteristics of being a rigid material, further pressing can not responsively generate additional displacement/deformation. On the other hand, supposing that a unit length of soft deformable object 13 subjected to compression hits its compression limit after reaching L2 displacement, a unit length of soft deformable object 13 can achieve deformation of a scale much larger than that of a unit length of spring, that is, L2>L1. Therefore, a reaction force of a unit length of the soft material corresponding to the deformation has a wider range. Because of the soft features of the soft material, it has a better buffer effect to better protect the force sensor 11 for avoiding being damaged when the pressure is too large. In this way, compared to the spring, the soft deformable object has an absolute advantage, however, the soft material has its own limitations. When the soft material and the force sensor 11 are in direct contact, a reaction force which transmits to the force sensor 11 by the soft material corresponding to a pressing force is uneven. That is, different parts of the force sensor 11 in contact with the soft material will detect different force intensities, and the overall force transmission performance of the soft deformable object 13 is poor, making a worse pressure detection of the force sensor 11. In the present disclosure, the rigid force conductor 12 is disposed between the soft deformable object 13 and the force sensor 11. Since the rigid force conductor 12 is rigid material which has better force transmission, the rigid force conductor 12 can better transmit the force to the force sensor 11 in contact. Since the deformation scale of the soft deformable object 13 is greater, the force detection range of the pressure sensing device 10 is increased, such that the multi-stage range of the force intensity can be detected. Although the force transmission performance of the soft deformable object 13 is poor, with the cooperated rigid force conductor 12, the poor force transmission performance is compensated. Moreover, the reaction force is directly transmitted to the force sensor 11 by the rigid force conductor 12 to avoid the poor force transmission problem of the soft deformable object 13, thus giving the pressure sensing device 10 better force transmission performance and access to a wider range of force magnitude detection.

2. Since the rigid force conductor 12 includes a bulge 121 and a sheet 122, the bulge 121 and the force sensor 11 are directly in contact, and a contact area between the force sensor 11 and the bulge 121 is smaller than an area of the first surface of the force sensor 11. The size of the sheet 122 is bigger than that of the bulge 121, which can stably transmit the force to the force sensor 11 through the bulge 121. The arrangement of the bulge 121 allows not only better concentrated force transmission, but also makes the force sensor 11 more sensitive to pressure, the corresponding principle is: P=F/S, wherein F is the magnitude of the reaction force, S is the contact area between the bulge 121 and the force sensor 11, P is the pressure scale that force sensor 11 detected. The smaller the S, the more obvious the effectiveness of the force sensor 11 in detecting pressure. Therefore, even if the electronic product is light touched, the force sensor 11 can sensitively respond to the pressing force to produce corresponding electrical signals. The contact area S between the bulge 121 and the force sensor 11 is 30%-80% of the area of the first surface 11' of the force sensor 11, and this both ensures that the bulge 121 and the force sensor 11 in finely contact and makes the force sensor 11 a better force transmission characteristic. Preferably, S is 50%-60% of the area of the force sensor 11.

3. Since the pressure sensing device 10 has a pre-pressing force design when it is disposed inside the electronic products, the pre-pressing force design not only makes the contact between the components tighter, but also avoids the presence of a gap between the components which would cause the pressing force to be undetectable or the detected pressing force to be less than the actual pressing force. At the same time, the design of the pre-pressing force can provide a calibration function for the force sensor 11 and make a pressing force-electrical signal curve generated by the force sensor 11 responsive to the pressing force with better linearity.

4. The sheet 122 of the rigid force conductor 12 is U-shaped or semi-U-shaped, when the rigid force conductor 12 is directly fixed on the carrier of the force sensor 11, it ensures the rigid force conductor 12 and the force sensor 11 are precisely aligned; or the rigid force conductor 12 is an extension from components such as the backlight baseplate in the LCD module, and is precisely aligned with the cover plate, which also ensures the precise alignment of the rigid force conductor 12 and the force sensor 11.

5. In a preferable embodiment, the rigid force conductor 12 is hard rubber with a sulfur coefficient over 25, and the soft deformable object 13 is soft rubber with a sulfur coefficient under 15, since there is affinity between the two materials, there is a great force transmission characteristic between two materials and resulting in an improved detection performance of the force sensor 11.

Figure 5A:
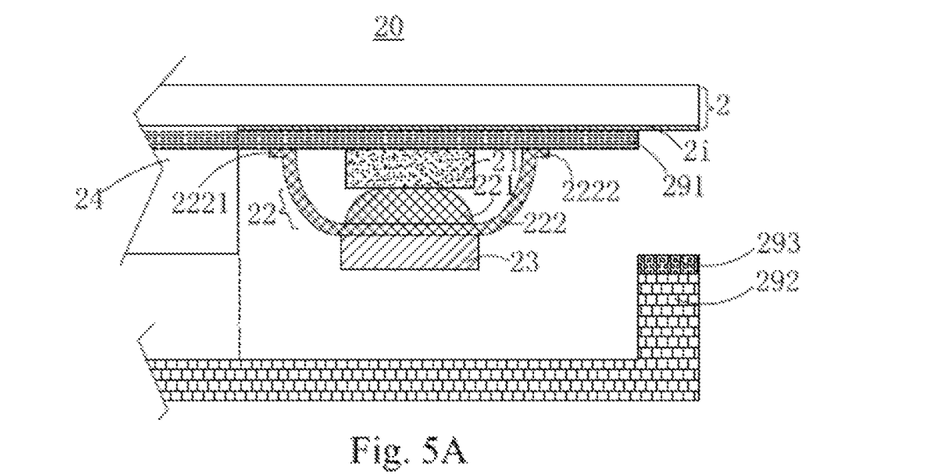
FIG. 5A is a diagram illustrating a state of the pressure sensing device before the assembly according to a second exemplary embodiment of the present disclosure.
Figure 5B:
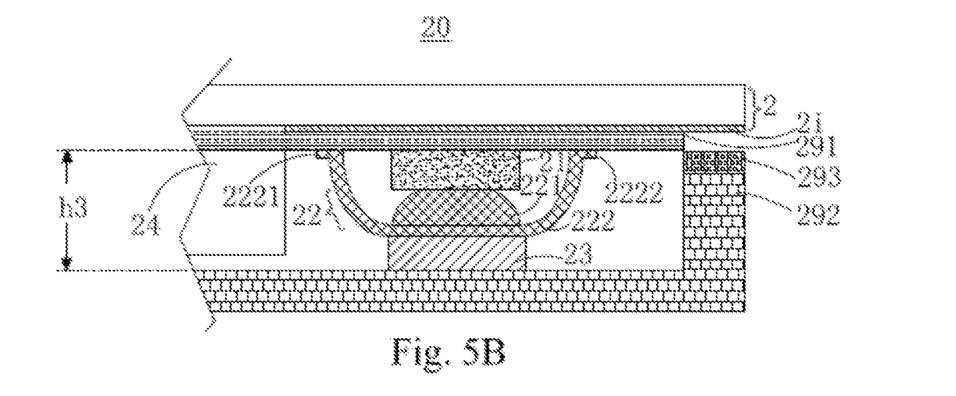
FIG. 5B is a diagram illustrating a state that the soft deformable object touches the casing when the pressure sensing device in FIG. 5A in the assembly process.
Figure 5C:
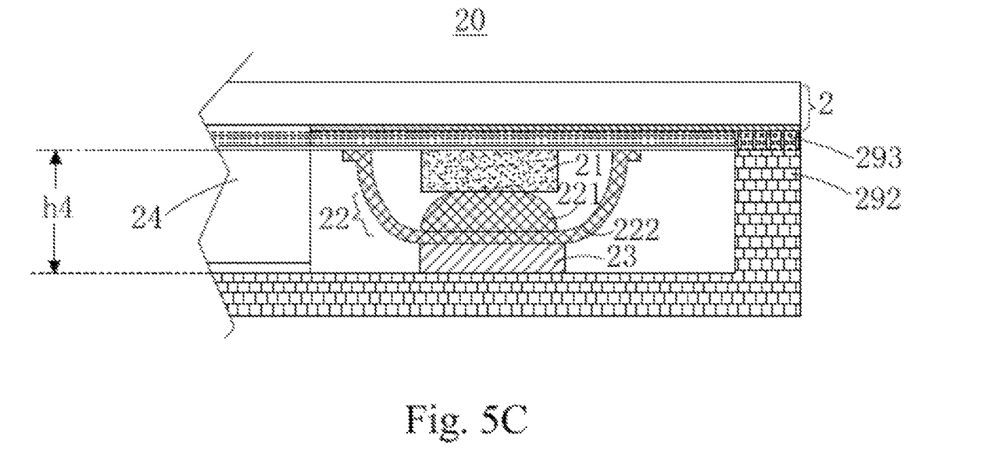
FIG. 5C is a diagram illustrating a state when the assembly of the pressure sensing device in FIG. 6A is completed.

Please refer to FIG. 5A-5C, wherein the second embodiment of the present disclosure provides a pressure sensing device 20. The pressure sensing device 20 further includes a cover plate 2, an LCD module 24, and a casing 292, wherein the LCD module 24 is placed between the casing 292 and the cover plate 2, and is attached under the cover plate 2. At least a force sensor 21 is disposed under the cover plate 2. Preferably, each of the four right angle positions of the pressure sensing device 20 has a force sensor 21. The force sensor 21 is disposed between the cover plate 2 and the casing 292.

In other words, the pressure sensing device 20 of this exemplary embodiment sequentially includes a first carrying layer 291, a force sensor 21, a rigid force conductor 22, and a soft deformable object 23. The first carrying layer 291 is an FPC layer, the force sensor 21 is formed on the FPC layer, and the FPC layer is attached to a surface of the cover plate 2 which is different from the pressing operation surface. A rigid force conductor 22 is disposed under the force sensor 21, and, the rigid force conductor 22 includes a bulge 221 and a sheet 222, wherein the bulge 221 is placed between the rigid force conductor 22 and the sheet 222. The bulge 221 is arch-shaped, with an arched top oriented towards the direction of the force sensor 21. The sheet 222 has a plane which is sufficiently in contact with the soft deformable object 23. In an exemplary embodiment, the sheet 222 further has two fixing legs, which can be bent into a U-shaped structure by bending the sheet material, and the U-shaped opening is placed towards the force sensor 21. The bulge 221 is placed on a bottom plane of the U-shaped sheet 222. The U-shaped sheet 222 includes a first leg 2221 and a second leg 2222, and the first leg 1221 and the second leg 1222 are disposed at the ends of the bottom plane of the U-shaped sheet 222 and are curved to keep the formable abilities, and are in contact with the first carrying layer 291. The bulge 221 and the force sensor 21 are in direct contact, the sheet 222 and the soft deformable object 23 are in direct contact, and the position of the sheet 222 corresponds to that of the rigid force conductor 22.

The cover plate 2 can be glass or film material, and it can be a cover plate structure with a touch electrode, including a plurality of first directional touch electrodes and/or a plurality of second directional touch electrodes, the first directional touch electrodes and/or second directional touch electrodes can be disposed on a surface of the cover plate 2 which is different from the pressing operation surface. In addition, the first directional touch electrodes and the second directional touch electrodes can be respectively disposed at two sides of another carrying layer, or be disposed on two different carrying layer, and then are attached to a surface of the cover plate 2 which is different from the pressing operation surface (the pressing operation surface is the other surface of the cover plate 2) with the force sensor 21, the rigid force conductor 22 and the soft deformable object 23.

The area under the cover plate 2 within which the LCD module 24 placed is the display area, and the area without the LCD module 24 is the non-display area. An ink layer 2i is disposed on a surface of the cover plate 2 corresponding to the non-display area, and the surface is different from the pressing operation surface. The ink layer 2*i* is used for covering the wires under the cover plate 2 corresponding to the non-display area. Form a view perpendicular to the pressing operation surface, the pressure sensing device is disposed right under the ink layer 2*i*, and the pressure sensing device and its wires are all covered by the ink layer 2*i*, that is, the vertical projection area of the pressure sensing device on the cover plate 2 and the vertical projection area of the ink layer 2*i* on the cover plate 2 complete overlap each other. It means the vertical projection area of the pressure sensing device on the cover plate 2 is completely covered by the vertical projection area of the ink layer 2*i* on the cover plate 2.

FIG. 5A is a diagram illustrating a state before the cover plate 2 of the pressure sensing device 20 is assembled, the force sensor 21 is attached to a surface of the cover plate 2 via the first carrying layer 291, wherein the surface is different from the pressing operation surface. The force sensor 21, the rigid force conductor 22 and a soft deformable object 23 are fixed to connect to the cover plate 2. Move the cover plate 2 towards the casing 292, and the soft deformable object 23 is gradually approached to the casing 292, when the soft deformable object 23 touches the casing 292, as shown in FIG. 5B, the pressure sensing device is not subjected to any external force; at this time a height of the force sensor 21, the rigid force conductor 22 and the soft deformable object 23 is h3. Keep moving the cover plate 2 towards the casing 292, till the assembly of the cover plate 2 and the casing 292 is completed. As shown in FIG. 5C, the cover plate 2 is attached to the casing 292 through an adhesive layer 293. At this time, a height of the force sensor 21, the rigid force conductor 22 and the soft deformable object 23 is h4, h4<h3. The pressure sensing device is clamped between the cover plate 2 and the casing 292, the soft deformable object 23 is subjected to the clamping action to thereby generate a reaction force and transmit the reaction force to the force sensor 21 by the rigid force conductor 22, and the force sensor 21 is subjected to a pre-pressing force.

The LCD module 24 can include a liquid crystal layer, a glass substrate, a polarizer, a filer, a light guide plate, and a backlight baseplate.

In another exemplary embodiment, before the assembly process of the cover plate 2 and the casing is completed, the soft deformable object 23 and the rigid force conductor 22 are separated placed. The soft deformable object 23 itself is disposed on the casing 292 in advance, and after the assembly of the cover plate 2 and the casing 292, the soft deformable object 23 and the rigid force conductor 22 will be in direct contact and the soft deformable object 23 will have a deformation.

As an exemplary embodiment, an end of the first leg 2221 or of the second leg 2222 can dispose at least two portions.

The pressure sensing device 10 in the first exemplary embodiment and the deformation manners are also applicable to this exemplary embodiment.

The force sensor 21, the rigid force conductor 22, and the soft deformable object 23 disposed inside the pressure sensing device 20 allow the pressure sensing device 20 to gain the pressure detecting (in the Z-axis) function, if the pressure sensing device 20 corporates with existing mature touch control structures for providing positioning detecting (in the X-axis and the Y-axis direction), the pressure sensing device 20 can achieve the three-dimensional detection of the pressing input operations. The force sensor 21 can be directly formed on the FPC layer connecting to the position detecting signals, and the FPC layer can be directly attached to the cover plate 2 to maximize the utilization. The pressure detecting structure such as the force sensor 21 can be disposed side by side with the touch control structure and/or the display device on a surface of the cover plate 2 which is different from the pressing operation surface, and the pressure detecting structure can be placed in the non-display area between the cover plate 2 and the casing 292. In this way, the existing structure space of the product is effectively used, the pressure sensing device 220 has pressure detection function in the case of almost without increasing the thickness of the product, to optimize the product structure.

Figure 6A:
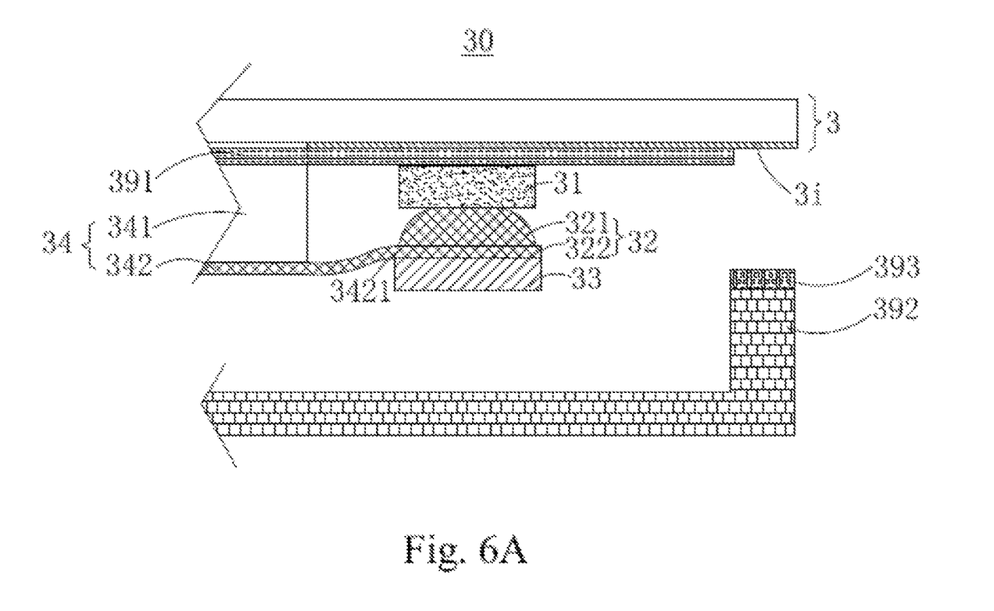
FIG. 6A is a diagram illustrating the state of the pressure sensing device before the assembly according to a third exemplary embodiment of the present disclosure.
Figure 6B:
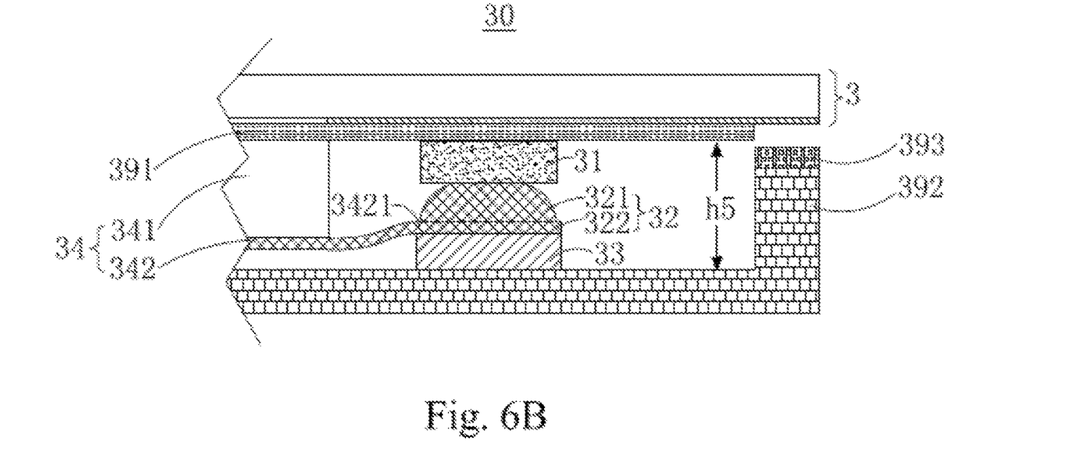
FIG. 6B is a diagram illustrating the state of the pressure sensing device in FIG. 6A in the assembly process, when the rigid force conductor touches the casing.
Figure 6C:
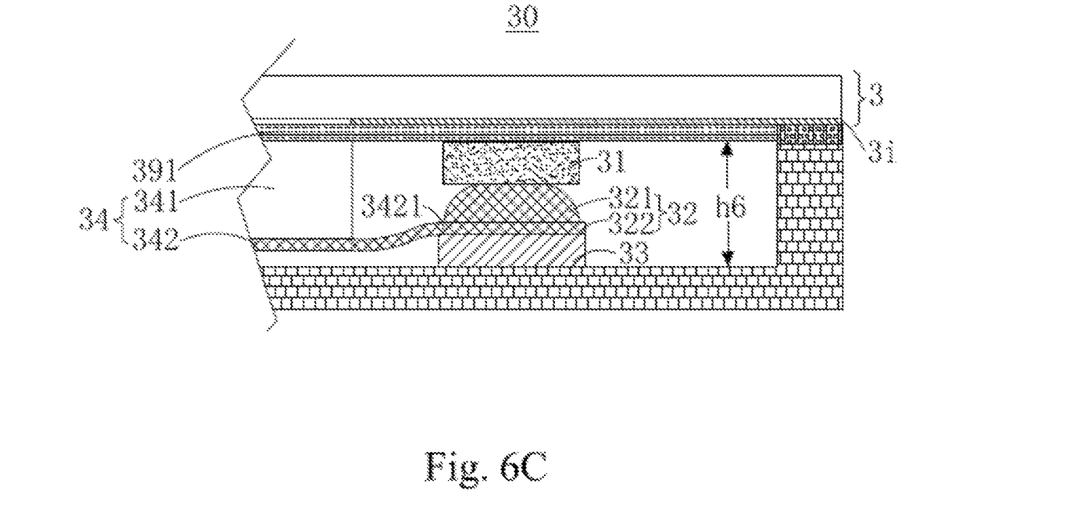
FIG. 6C is a diagram illustrating the state of the pressure sensing device in FIG. 6A when the assembly is completed.
Figure 6D:
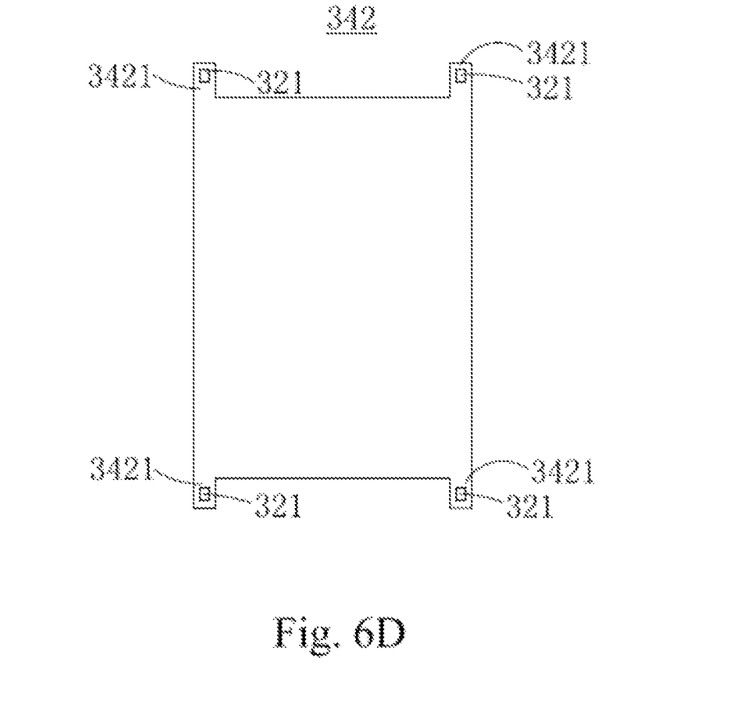
FIG. 6D is a diagram illustrating a two-dimensional structure of the backlight baseplate in FIG. 6A.

Please refer to FIG. 6A-FIG. 6C. A pressure sensing device 30 with a pressing force sensing function according to a third exemplary embodiment of the present disclosure is provided. The pressure sensing device 30 includes a cover plate 3 (it can be a cover plate structure with a positioning detection function), an LCD module 34, and a casing 392. The LCD module 34 is disposed between the casing 392 and the cover plate 3, and the LCD module 34 includes an LCD element 341 and a backlight baseplate 342, the LCD element 341 includes one or more elements such as a liquid crystal, a filter, a polarizer, a light guide plate, and/or a glass substrate. The backlight baseplate 342 is used to mechanical support the LCD element 341. In this embodiment, the LCD module 34 and the cover plate 3 will be precisely aligned (the LCD module 34 and the cover plate 3 can use some aligning marks to execute precise alignment, and then to be fixed together by optical cement). The specific structure of the backlight baseplate 342 is shown in FIG. 6D; it is generally in rectangular, and is formed by rigid metal material. When the cover plate 3 is correspondingly attached to the LCD module 34, the backlight baseplate 342 extends four expanding portions 3421 along the direction towards the force sensor 31 (i.e., the four right angles in FIG. 6C). The extending portions 3421 are served as the rigid force conductor 32, and the surface of which approached to the cover plate 3 is integrally disposed a bulge 321, the bulge 321 after the corresponding attachment will be at the central of the force sensor 31. In this embodiment, since the LCD module 34 is precisely aligned with the cover plate 3, ensures the precise relative positioning between the extending portion 3421 of the backlight baseplate 342 and the force sensor 31 disposed on the surface of the cover plate 3 which is different from the pressing operation surface, in this way, the extending portions 3421 served as the rigid force conductor 32 do not need to be formed in U-shaped or C-shaped and fixed on a surface of the cover plate 3 which is different from the pressing operation surface.

At least a first carrying layer 391, a force sensor 31, a rigid force conductor 32 and a soft deformable object 33 are disposed under the cover plate 3 of the pressure sensing device 30. The first carrying layer 391 is an FPC layer, and the force sensor 31 is formed on the FPC layer, wherein the FPC layer is attached to a surface of the cover plate 3 which is different from the pressing operation surface. The rigid force conductor 32 includes a bulge 321 and a sheet 322, in this embodiment, the sheet 322 is the extending portions 3421 of the backlight baseplate 342. A soft deformable object 33 is disposed between the extending portions 3421 and the casing 392, and the position of the soft deformable object 33 corresponds to that of the bulge 321. The soft deformable object 33 is attached to the casing 392 or to the surface of the extending portion 3421 which is close to the casing 392.

FIG. 6A is a diagram illustrating the state of the cover plate 3 of the pressure sensing device 30 before it is assembled. An FPC layer with a force sensor 31 disposed on is attached to a surface of the cover plate 3 which is different from the pressing operation surface. The LCD element 341 is fixed to a side of the backlight baseplate 342 which is closed to the cover plate 3. The extending portion 3421 of the backlight baseplate 342 is placed between the bulge 321 and the soft deformable object 33, and the force sensor 31, the bulge 321 and the extending portion 3421 correspond to the place of the soft deformable object 33. Move the cover plate 3 towards the casing 392, when the soft deformable object 33 touches the casing 392, as shown in FIG. 6B, there is no external force on the pressure sensing device, at this time, a height of the force sensor 31, the rigid force conductor 32 and the soft deformable object 33 is h5. Keep moving the cover plate 3 towards the casing 392 till the assembly of the cover plate 3 and the casing 392 is completed, as shown in FIG. 6C, the cover plate 3 is attached to the casing 392 via the adhesive layer 393. At this time, a height of the force sensor 31, the rigid force conductor 32 and the soft deformable object 33 is h6, wherein h6<h5. The pressure sensing device is clamped between the cover plate 3 and the casing 392, the soft deformable object 33 generates a reaction force responsive to the clamping and transmits the reaction force to the force sensor 31 through the rigid force conductor 32, and the force sensor 31 is subjected to a pre-pressing force.

The area with an LCD module 34 disposed under the cover plate 3 is the display area, and the area without the LCD module 34 is the non-display area. An ink layer 3i is disposed on a surface of the cover plate 3 corresponding to the non-display area, wherein the surface is different from the pressing operation surface, the ink layer 3i is used for covering the wires under the cover plate 3 corresponding to the non-display area. From a view perpendicular to the pressing operation surface, the pressure sensing device is disposed right under the ink layer 3i, and the pressure sensing device and its wires are all covered by the ink layer 3i. That is, the vertical projection area of the pressure sensing device on the cover plate 3 and the vertical projection area of ink layer 3i on the cover plate 3 are complete overlapped. It means the vertical projection area of the pressure sensing device on the cover plate 3 is included by the vertical projection area of the ink layer 3i on the cover plate 3.

The pressure sensing device 10 in the first exemplary embodiment and the deformation manners are also applicable to this exemplary embodiment.

In this exemplary embodiment, the pressure sensing device 30 uses the extending portion 3421 on the backlight baseplate 342 of the LCD module 34 as the sheet 322 of the pressure sensing device, and the backlight baseplate 342 is the existing structure of the electronic products, hence the existing element is used as the element of the pressure sensing device, to reduce the cost of the pressure sensing devices and decrease the thickness of the pressure sensing device 30. In the present disclosure, the positions between the force sensor 31, the rigid force conductor 32, and the soft deformable object 33 will affect the force detection performance of the pressure sensing device 30, in this embodiment, sine the positions of the cover plate 3 and the LCD module 34 are highly matched, that is the position of the cover plate 3 complete corresponds to that of the LCD module 34 when they are attached, thereby improving the force detection performance of the pressure sensing device 30.

Figure 7:
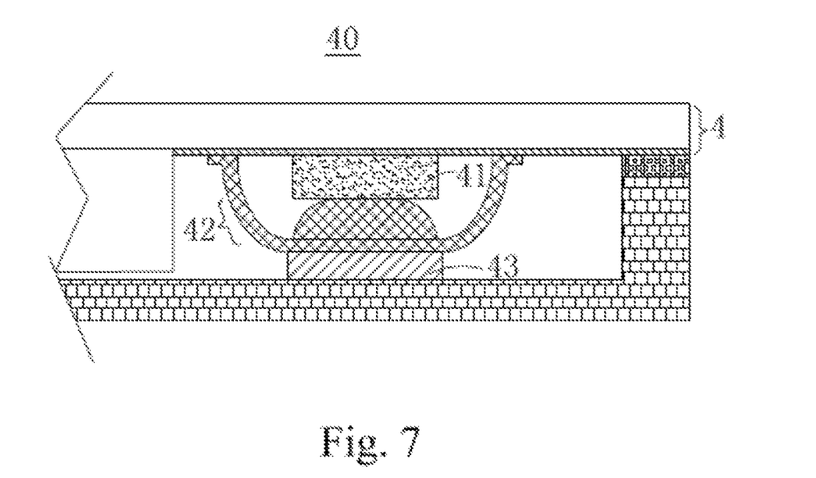
FIG. 7 is a diagram illustrating a structure of the pressure sensing device according to a fourth exemplary embodiment of the present disclosure.

Please refer to FIG. 7. FIG. 7 is a diagram illustrating a pressure sensing device 40 according to a fourth exemplary embodiment of the present disclosure. The difference between the pressure sensing device 40 and the pressure sensing device in the second exemplary embodiment shown in FIG. 5C is that the force sensor 41 is directly disposed on a surface of the cover plate 4 which is different from the pressing operation surface, and the surface of the cover plate 4 different from the pressing operation surface is used as the carrying layer. The rigid force conductor 42 is disposed between the force sensor 41 and the soft deformable object 43, and keeps in contact with the force sensor 41 and the soft deformable object 43. In this way, the disposition of the FPC layer can be omitted, to thereby reduce the thickness of the pressure sensing device 40. The solution provided in this exemplary embodiment can be applicable to other exemplary embodiments of the present disclosure.

Although the present disclosure has been described in considerable detail with reference to certain embodiments thereof, other embodiments are possible. Therefore, the spirit and scope of the appended claims should not be limited to the description of the embodiments contained herein.

What is claimed is:

1. A pressure sensing device, comprising a force sensor, a rigid force conductor and a soft deformable object, wherein the rigid force conductor is disposed between the force sensor and the soft deformable object,
    wherein the rigid force conductor comprises a sheet placed between the force sensor and the soft deformable object, and directly in contact with the soft deformable object.

2. The pressure sensing device of claim 1, wherein the rigid force conductor further comprises a bulge, the bulge and the sheet are formed integrally or separately, the bulge is placed between the force sensor and the sheet, and directly in contact with the force sensor.

3. The pressure sensing device of claim 2, wherein a surface on which the force sensor and the bulge make contact is a first surface, and a contact area of the bulge and the force sensor is smaller than an area of the first surface.

4. The pressure sensing device of claim 1, wherein the sheet is U-shaped or semi-U-shaped.

5. The pressure sensing device of claim 1, wherein one end of the sheet has at least two portions.

6. The pressure sensing device of claim 1, wherein the sheet is C-shaped, and one end of the sheet has two portions, between the two portions of the sheet is an opening, a bulge is disposed on an inner wall of the sheet corresponding to a position of the opening, the bulge and the sheet are formed integrally or separately, and the position of the opening is corresponding to a position of the force sensor.

7. The pressure sensing device of claim 1, wherein the rigid force conductor is one of a metal, a hard rubber, or a plastic, and the soft deformable object is one of a soft rubber, a foam, or a silicon.

8. The pressure sensing device of claim 1, wherein the rigid force conductor is a hard rubber with a sulfur coefficient over 25, and the soft deformable object is a soft rubber with a sulfur coefficient under 15.

9. The pressure sensing device of claim 1, further comprising a first carrying layer and a second carrying layer, wherein the force sensor is disposed on the first carrying layer, and the soft deformable object is disposed on the second carrying layer or on the rigid force conductor.

10. The pressure sensing device of claim 9, wherein at least one end of the sheet of the rigid force conductor is connected to the first carrying layer.

11. The pressure sensing device of claim 9, further comprising a casing, wherein the first carrying layer is a pressing operation cover plate and the second carrying layer is a portion of the casing.

12. The pressure sensing device of claim 9, further comprising a cover plate and a casing, wherein the first carrying layer is a flexible printed circuit (FPC) layer attached on the cover plate, and the second carrying layer is a portion of the casing.

13. The pressure sensing device of claim 9, further comprising a liquid-crystal display (LCD) module having a backlight baseplate, wherein the LCD module is placed between the first carrying layer and the second carrying layer, wherein an extending portion is formed by extending from a right angle position of the backlight baseplate, and wherein the sheet of the rigid force conductor is formed by bending the extending portion.

14. The pressure sensing device of claim 9, wherein a clamping force is generated by a way of the first carrying layer and the second carrying layer clamping the force sensor, the rigid force conductor and the soft deformable object formed therebetween.

15. The pressure sensing device of claim 14, wherein the soft deformable object has a slight deformation under the clamping force and correspondingly generates a reaction force.

16. The pressure sensing device of claim 15, wherein the rigid force conductor transmits the reaction force to the force sensor as a pre-pressing force for calibration.

17. The pressure sensing device of claim 16, wherein a resistance value of the force sensor is adjusted according to the pre-pressing force.

18. The pressure sensing device of claim 16, wherein an electrical signal detected by the pressure sending device is corrected according to the pre-pressing force.

19. The pressure sensing device of claim 16, wherein the pre-pressing force is 0.5-1.5N.

20. The pressure sensing device of claim 9, further comprising an ink layer, wherein the first carrying layer has a display area and a non-display area, wherein the ink layer is correspondingly disposed on the non-display area, and wherein the force sensor, the rigid force conductor and the soft deformable object are disposed right under the ink layer.

* * * * *